United States Patent
Bühring

(10) Patent No.: US 7,034,077 B2
(45) Date of Patent: *Apr. 25, 2006

(54) FOIL OR MOLDED BODY BASED ON A TRANSPARENT POLYMERIC MIXTURE

(75) Inventor: Jürgen Bühring, Göppingen (DE)

(73) Assignee: Benecke-Kaliko AG, Hannover (DE)

( * ) Notice: Subject to any disclaimer, the term of this patent is extended or adjusted under 35 U.S.C. 154(b) by 141 days.

This patent is subject to a terminal disclaimer.

(21) Appl. No.: 10/654,629

(22) Filed: Sep. 2, 2003

(65) Prior Publication Data

US 2004/0116600 A1    Jun. 17, 2004

(30) Foreign Application Priority Data

Sep. 2, 2002 (DE) .................. 102 40 970

(51) Int. Cl.
*C08F 8/00* (2006.01)
*C08L 9/00* (2006.01)
*C08L 23/00* (2006.01)
*C08L 23/04* (2006.01)
*C08L 41/00* (2006.01)

(52) U.S. Cl. .................. 525/191; 525/192; 525/206; 525/232; 525/240

(58) Field of Classification Search .................. 525/191, 525/192, 206, 232, 240
See application file for complete search history.

(56) References Cited

U.S. PATENT DOCUMENTS

| | | | | |
|---|---|---|---|---|
| 5,180,783 A | | 1/1993 | Seguela et al. | |
| 5,288,531 A | * | 2/1994 | Falla et al. | 428/35.2 |
| 6,162,865 A | | 12/2000 | Buehring et al. | |
| 6,204,335 B1 | * | 3/2001 | Somers | 525/240 |
| 6,749,910 B1 | * | 6/2004 | Georgelos et al. | 428/34.9 |
| 6,784,245 B1 | * | 8/2004 | Buhring | 525/69 |

FOREIGN PATENT DOCUMENTS

DE    196 53 590 A1    6/1998
EP    0 204 453    12/1986

OTHER PUBLICATIONS

European Search Report dated Dec. 10, 2003.

* cited by examiner

Primary Examiner—Nathan M Nutter
(74) Attorney, Agent, or Firm—Darby & Darby

(57) ABSTRACT

The invention relates to a foil or molded body based on a transparent and high frequency weldable polymer mixture containing a) (I) a copolymer of ethylene with about 8 to 60% by weight of comonomers, selected from vinyl esters of saturated $C_2$–$C_8$ carboxylic acids saturated $C_1$–$C_{12}$ alkylacrylates and methacrylates, optionally with carbon monoxide as termonomer, and/or (II) ethylene homopolymer, ethylene copolymer, propylene homopolymer and/or propylene copolymer with about 8 to 60% by weight of grafted units of unsaturated carboxylic acids, dicarboxylic acids, their esters and/or anhydrides or (III) a mixture of two or more of the above mentioned compounds, independently of their allocation to groups, whereby the polymers or their mixture have a melt index MFI (190° C.; 2.16 kg) of about 0.2 to 15.0 g/10 min and b) a copolymer of ethylene with about 10 to 30% by weight of $C_3$–$C_{12}$–$\alpha$-olefin with a melt index MFI (190° C., 2.16 kg) of about 0.2 to 15.0 g/10 min, whereby the material of the foil and of the molded body is partially interlaced.

21 Claims, No Drawings

FOIL OR MOLDED BODY BASED ON A TRANSPARENT POLYMERIC MIXTURE

The present application claims priority from German application number DE 102 40 970.6 filed Sep. 2, 2002, which is incorporated herein by reference in its entirety.

FIELD OF THE INVENTION

The invention relates to a foil and a molded body based on a transparent and high frequency weldable polymeric mixture.

BACKGROUND OF THE INVENTION

Foils of the type described above are known. They are based generally on polyvinyl chloride. Polyvinyl chloride has the advantage of good HF-weldability and also of the transparency which is required in individual cases. PVC-products have been used for technical applications for many years and in the most diverse products. Owing to the trend of reducing the application of materials containing chlorine and plasticisers in all areas of life, there exists in the construction, automobile and cable sectors an urgent requirement for halogen-free alternative products.

A problem in the search for halogen-free alternative products often comprises the fact that PVC foils can very readily be welded by high frequencies as against which possible PVC replacement materials, such as for instance polyurethane foil or known thermoplastic polyolefin foils cannot be welded, or only with difficulty.

A further characteristic, which plays a role especially in the automobile sector, is sufficient cold flexibility of the material. High cold flexibility is especially important if the materials are subjected to dynamic loading at low temperatures. Thus for instance polyolefin foil materials serve as decor for covered airbag systems. In order for such a material to be, suitable for such an application it must be ensured that it does not become brittle or have a high frictional index at the test temperatures (customarily −30° C.), whereby the penetration of the décor by the airbag flap would be impaired. It must also be provided that the material does not splinter because of its embrittlement. These splinters could lead to injuries to the passengers. Consequently embrittlement of the foil material must be avoided and a desired opening of the airbag at low temperatures (free from flying particles) must be ensured.

High cold flexibility is also for instance important in storage space covers, which can be realised in the form of sheets or rollers where even in cold conditions satisfactory on and off rolling must be assured. At the same time for applications in automobile or vehicle areas stability under heat of at least 100° C. must be provided. Heat stability in this case means that the surface structure or finish must remain in the original condition following a 21-day storage at this test temperature and furthermore no additional sheen is to be seen.

The PVC-products mentioned fulfill a major part of the present requirements being discussed. They are especially also transparent, which is required in individual cases. Nevertheless they exhibit the disadvantage that they include plasticisers with their known disadvantages. Here especially the insufficient ageing stability and the emissions caused by the plasticisers should be mentioned. Both in automobile and also in the shoe sector there are strong tendencies to replace the widespread PVC materials by halogen-free substances. However many characteristics of polyvinyl chloride can only be displayed by other material classes after very high innovative expenditure.

There are indeed certain proposed solutions, which however are not altogether fully satisfactory. Here we should mention EP 0 703 271 A1. This describes a polyolefin composition, which is thermoplastic, halogen-free and flexible at room temperature. Here ethylene vinyl acetate-copolymers as well as polyethylene with very low density are used. Although these formulations are often useful for several applications they have the disadvantage that they do not exhibit sufficient heat stability as soon as they are exposed to temperatures greater than 80° C.

The state of the technology according to DE 100 18 196 A1, describes the method of production of a surface finished foil from a mass with a content of non-interlaced polyolefins and possibly other additives, whereby the foils obtained in the normal manner by obtaining a surface finish stability suitable for deep drawing are processed using electron beams, and the surface finished foil is deep drawn to a density of about 0.7 to 1.2 g/cm$^3$. As non-interlaced polyolefins polypropylene, polyethylene, polypropylene-copolymers or terpolymers with $C_2$, $C_4$ to $C_{12}$-α-Olefins and/or polyethylene-copolymers or terpolymers with $C_3$ to $C_{12}$-α-Olefins are used. The foils obtained are distinguished especially by good surface finish stability and can be stamped and laminated. They are however not HF weldable.

DE 196 53 590 C2, similarly concerns a PVC-free and thereby also halogen-free high frequency weldable polymer mixture. It must include a thermoplastic polyolefin comprising a polyamide as well as other copolymers, ethylene for instance but is however not transparent, owing to the thermoplastic polyolefin which contains polyamide. In accordance with the post-published DE 101 53 408, a high frequency weldable polymer mixture is similarly described which contains some 1 to 30% by weight of an ethylene copolymer with a content of polar comonomers below about 25% by weight selected from the group of vinylester of saturated $C_2$–$C_8$-carboxylic acid and $C_1$–$C_{12}$-alkylacrylate and/or methacrylate, about 1 to 40% by weight of a terpolymer or a further copolymer with a content of comonomers above about 25% by weight, and about 35 to 75% by weight of a thermoplastic polyolefin with a melting point above about 115° C. This polymer mixture is however not transparent owing to the last named component.

It is consequently the aim of the current invention to propose foils or molded bodies which do not have a basis in PVC and consequently are free from halogens, however continue to show the advantageous characteristics of PVC foils, namely transparency, HF weldability and stability under heat, a desirably good flexibility when cold and stability under ageing and furthermore also exclude or minimise the disadvantageous emissions which are associated with the application of PVC foils.

SUMMARY OF THE INVENTION

In accordance with the invention this aim is addressed by a foil or a molded body based on a transparent and high frequency weldable polymer mixture comprising:

a) (I) a copolymer of ethylene with about 8 to about 60% by weight of comonomers selected from vinyl esters of saturated $C_2$–$C_8$ carboxylic acids $C_1$–$C_{12}$ alkylacrylates and methacrylates, optionally with carbon monoxide as termonomer, and/or (II) ethylene homopolymer, ethylene copolymer, propylene homopolymer and/or propylene copolymer with about 8 to about 60% by weight of grafted units of unsaturated carboxylic acids, dicarboxylic acids, their esters and/or anhydrides or (III) a mixture of two or more of the above mentioned compounds independent of their group allocations whereby the polymers or their mixture have a melt index MFI (190°C.; 2.16 kg) of about 0.2 to about 15.0 g/10 min and b) a copolymer of ethylene with approximately 10 to 30% by weight of $C_3$–$C_{12}$-α-olefin with a melting index MFI (190° C.; 2.16 kg) of about 0.2 to 15.0 g/10 min, whereby the material of the foil or of the molded body is partly crosslinked.

In accordance with the invention a foil or a molded body based on a transparent and high frequency weldable polymer mixture is consequently prepared as a tailor-made composition for the desired application, which has the necessary characteristic profile. Thus polar polymers are available which facilitate the high frequency welding capability and make available an advanced cold flexibility. In addition an increased temperature stability is available without however the weldability and excellent cold flexibility being impaired. Additionally a transparent product is available.

DETAILED DESCRIPTION OF THE INVENTION

The components of the polymer mixture prepared under the invention are explained in detail below:

The component a) according to the invention comprises three optional possibilities. According to modification (I) a copolymer of ethylene is contained with a polar comonomer. As polar comonomers vinylesters of saturated $C_2$–$C_8$ carboxylic acids, $C_1$–$C_{12}$-alkylacrylates and methacrylates, optionally with carbon monoxide as termonomer, can be used. Preferred examples are ethylene-vinyl acetate-copolymer, ethylene-methylacrylate-copolymer, ethylene-ethylacrylate-copolymer and/or ethylene butylacrylate-copolymer. The comonomer content is adjusted in the range of some 8 to about 60% by weight, preferably of about 14 to about 45% by weight, especially of about 14 to about 28% by weight. Especially preferable examples are provided by ethylene-vinylacetate-copolymer as well as ethylene-methylacrylate-copolymer.

Especially preferred a mixture comes into application, which falls into the group of compounds under component a) option (I) especially in the form of a mixture of various ethylene-vinylacetate-polymer types.

Apart from this terpolymers can be applied which are constructed from ethylene, one or more of the comonomers given under the option (I) and carbon monoxide, the individual monomer units are distributed statistically over the polymer chains. The presence of carbon monoxide can offer advantages for the capability of welding by HF. A preferred example is vinylacetate-carbon monoxide-terpolymer.

As component a) in accordance with option (II) grafted polymerizates of ethylene homopolymer, ethylene copolymer, propylene homopolymer and/or propylene copolymers can be applied whereby as the grafted monomer about 8 to about 60% by weight of unsaturated carboxylic acids, dicarboxylic acids, their esters and/or anhydrides can be used. Unsaturated (di-) carboxylic acids or their derivatives are for instance acryl acids methacryl acids, maleic acids, maleic acid anhydride and fumaric acid. Ethylene homo-or- copolymerizates grafted with maleic acid are especially preferred. Mixtures of these polymers or grafted polymers can also be used.

As option (III) of the components a) a mixture of two or more of the compounds noted above corresponding to option (I) and/or (II) can be applied independently of their allocation to groups.

The polymer or polymer mixes of component a) have in each of the three options discussed above a melt index MFI (190° C.; 2.16 kg) in the range of about 0.2 to 15 g/10 min, especially between about 0.3 to about 4.0 g/10 min.

The further components b) of the polymer mixture according to the invention include a copolymer of ethylene with about 10 to about 30% by weight of $C_3$–$C_{12}$-α-olefin. As α-olefin for instance ethylene, 1-butene, 1-propene, 1-pentene, 1-hexene, 1-octene and/or 4-methyl pentene-1 are used whereby especially 1-propene, 1-butene, 1-hexene and 1-octene are preferred. The components b) have a melt index MFI (190° C.; 2.16 kg) of about 0.2 to about 15.0 g/10 min, especially between about 0.2 and about 4.0 g/10 min.

The maintenance of the MFI values for components a) and b) is here critical, since in the manufacturing process the softened masses must have sufficient stability to be machinable. On the other hand the polymer mixtures must have a sufficient flow capability in the welding process.

In accordance with a further embodiment according to the invention the components b) can include additionally a termonomer from the group of the non-conjugated dienes. Suitable non-conjugated-dienes are linear aliphatic-dienes, for instance 1,4-hexadiene, alkylidenebicycloalkenes such as 5-ethylidene-2-norbornene, alkylidenbicycloalkenes, such as 5-alkenyl-2-norborene, bicycloalkadienes, such as bicyclopentadienes and alkenyl cycloalkenes, such as vinyl-cyclohexenes or also di-reactive non-conjugated dienes, such as 2.5-norbornadiene or 1,6-octadiene. Especially preferred are 5-ethylidene-2-norbornene and/or 1,4-hexadiene.

The weight ratio of component a) to component b) lies preferably between about 99:1 and about 40:60, especially between about 95:5 to about 60:40. The amount of components a) and b) in the material of the foil or of the molded body preferably amounts to at least about 80% by weight especially at least about 90% by weight.

In accordance with the invention the material of the foil or of the molded body is present partly cross-linked. Especially preferred the gel content of the polymer mixture is set to about 1 to about 60% preferably between about 5 and about 45%, especially preferred between about 10 and about 40% especially between 10 and about 30%. This has the advantage that a defined phase morphology of the amorphous phase is present and that the increased ratio of soft polymer components, which improve the cold flexibility leads to no impairment of the temperature stability owing to the cross-linking. The cross-linking can be present already in the polymer mixing or from or after the forming method has been performed.

Preferably for the optimisation of cold flexibility an additional polymer with a glass transfer temperature of ≦−30° C. is embodied. Hereby this can be a partially cross-linked thermoplastic elastomer, especially in the form of a partially cross-linked thermoplastic olefin (TPO) with a melt index MFI (230° C.: 10 kg) of about 5 to about 30 g/10 min. This represents for instance a rubber-like polymer especially a poly(diene) (e.g., polybutadiane, polychloroprene, polyisoprene and poly(2,3-dimethylbutadiene), which can also be partially hydrogenated. Further components for the optimisation of cold flexibility are, which may be in a quantity of up to about 20% by weight related to 100% by weight of the components a) plus b) are known by one of ordinary skill in the art.

The polymer mixture according to the invention can apart from this include customary additives, which do not impair the required transparency of the foil and of the molded body and also do not essentially influence the high frequency weldability. Possible additives include anti block agents, lubricants, light protective agents, antioxidants, dyes, pigments, flame-retardants and/or anti-statics. The additives are customarily added in amounts up to 10% by weight, related to the quantity of polymeric components. In the incorporation of pigments it is furthermore an advantage if their concentration lies not above 3% by weight especially not more than 0.5% by weight.

The foil or molded body according to the invention including the polymer mixtures noted above are manufactured in accordance with the normal methods. The production of the foil according to the invention or of the molded body lies in the purely manual work sector. This can therefore for instance occur by extrusion or calendering to flat formations or foils, whilst the manufacture of molded bodies can be performed for instance using injection moulding or blow moulding processes. These products can then be submitted to the normal further handling, for instance even for the improvement of the surface stability, to be provided with a protective coating. Preferably the surface of the foil or of the molded body can be submitted to corona processing, plasma processing or flaming to improve its printing capability. Then optimally the possibility exists of providing the foil or the molded body for instance with a surface structure.

A foil manufactured from the polymer mixture according to the invention can for instance be manufactured as follows: Preferably the granulated raw material is mixed cold and taken to an extruder, for instance a twin screw extruder and there plastisizied. The material is then forced out through a broad slit nozzle into a stripware (foil) and taken up by the following devices. Molded bodies are for instance obtainable by deep drawing or pressing from foil. Preferably cross-linking occurs following manufacture of the foil or of the molded body. The foil obtained or the molded body are advantageously halogen-free.

In accordance with an especially preferred embodiment of the invention the foil/the molded body is formed in several layers, especially an intermediate layer in the form of a carrier layer can be present. Preferably the intermediate layer is interrupted, for instance perforated so as to improve the bonding of the overall item. It can be advantageous if the intermediate layer is present in the form of a web, so as to facilitate stitching.

As already discussed the possibility exists of interlacing the foil or the molded body even after its shaping. This can especially occur under the effect of electron or gamma rays. The radiation can here be performed on one side and also on both sides. The mechanical characteristics of the foil according to the invention can be controlled within determined limits by interlacing for instance by an adjusted ray dose. Advantageously here handling with electron rays is performed using a ray dose of about 10 to 500, especially about 30 to 300 kJ/m$^2$. The gel content also, which is of major importance for the mechanical characteristics, is influenced by this. In the context of the present invention the gel content is determined according to the extraction method, wherein following 24 hours extraction of material in boiling Xylol and 10 minutes storage in acetone at a room temperature following 24 hour drying at 60° C. the quantity of the non dissolved material is determined and set in relation to the applied amount. Advantageously as already explained following the cross-linkage the overall gel content lies between about 1 and about 60%.

A further important criterion for the foil according to the invention or the molded body is the so-called fogging, i.e. the misting up for instance of a windscreen. This occurs according to the invention according DIN 75201B using the determination of condensation which advantageously amounts to <1.0 mg, preferably <0.5 mg.

The foil, especially soft foil, or the molded body preferably finds use in the automobile sector as airbag covering, roof liner, supporting loops, rear parcel shelf, seating and back upholstery as well as the rear side covering of the front seats, sun shades, step plates, door side covering, boot covering, soft top covering, folding roof, double acting door foils or design elements in the furniture or shoe sectors. As well as these, applications in the external covering of suitcases, book bindings etc are possible. In an advantageous embodiment as a folding roof the foil can expediently be built up from an upper and a lower foil, a carrier lying between them and possibly further foils and layers whereby the upper and lower foils include the polymer mixture of the invention.

The advantages linked to the invention are many sided. Thus in accordance with the invention foils and molded bodies are prepared which are not based on PVC and consequently are free of halogens and plasticisers, but continue to show the advantageous characteristics of PVC foils, namely transparency, capability of being welded by HF, stability under heat, flexibility when cold and in addition good UV and ageing stability. The disadvantageous emissions, which are associated with the application of PVC foils containing plasticisers, can be avoided.

Thus the foils for molded bodies according to the invention possess a surprising combination of characteristics as opposed to the state of the technology described at the beginning. The compounds have an excellent cold flexibility. Therefore foils or molded bodies can be made which even at low temperatures can be exposed to high dynamic loadings, without splintering. At the same time a sufficiently high temperature stability is made available. A further substantial characteristic of the polymer mixtures prepared in accordance with the invention is the capability of high frequency welding, whereby applications appear which with the systems matching the state of the technology have for a long time not been possible. Furthermore the foils/molded bodies of the invention are transparent which is desirable for many applications. At the same time for applications in automobile or vehicle sectors the required stability under heat is provided, whereby further no additional surface shine appeared.

The foil or the molded body of the invention facilitates thereby the targeted control of the characteristics profile and delivers a tailored compound for the corresponding application.

The invention is described in detail below using embodiments, which should not limit the possible applications. For the specialist, further embodiments are obvious in the context of the publication according to the invention.

EXAMPLE

In the examples the following application materials are used:

EVA 1 Ethylene-Vinylacetate-Copolymer,
  MFI=1 g/10 min (190° C.; 2.16 kg)
    Vinylacetate content: 17% by weight EVA2 Ethylene-Vinylacetate-Copolymer
  MFI=2 g/10 min (190° C.; 2.16 kg)
  Vinylacetate content: 25% by weight
EVACO Ethylene-vinylacetate-carbon monoxide-terpolymer
  MFI=15 g/10 min (190° C.; 2.16 kg)
  Vinylacetate content: 20% by weight
  Carbon monoxide content: 8% by weight
PE 1 LLDPE with a density of 0.93 g/l
  MFI=1 g/10 min (190° C.; 2.16 kg), melting point 128° C.
PE2 VLDPE with a density of 0.87 g/l and an MFI of 0.5 g/10 min (190° C.; 2.16 kg), melting point 70° C.

|  | Example 1 (Reference Example) | Example 2 (Reference Example) | Example 3 (Invention) |
|---|---|---|---|
| EVA 1 |  | 20 | 65 |
| EVA 2 | 65 |  |  |
| EVACO |  | 35 |  |
| PE1 | 35 |  |  |
| PE2 |  | 45 | 35 |
| Extrusion ratio | i.O. | i.O. | i.O. |
| Gel content [%] | 15 | 0 | 15 |
| 5% Module - 30° C. | 22 | 4 | 17 |
| HF-Weldability | i.O. | i.O. | i.O. |
| Peeling force [N] | 42 | 50 | 35 |
| Transparent (Visual) | No | Yes | Yes |
| Light test stability DIN 75202 5 cycles | Stages 4–5 | Stage 1, loss of surface graining | Stages 4–5 |
| Surface change following heat ageing 24 hours, 100° C. | None | Increase in shine, flattening of graining | None |
| Condensate (16 h, 100° C.) to DIN 75201B | 0.3 | 0.3 | 0.3 |

Example 1 (Reference Example)

65% parts by weight of EVAL and 35% part by weight of PE1 are mixed in a drum mixer and then in a twin roller extruder extruded to a 0.5 mm thick foil at 190° C. The foils are then provided with a surface structure by pressing with a grained plate. Pressing occurs at a pressure of 15 bar, 190° C. for 5 minutes. The foil is then cross-linked.

For the HF welding test two foils are welded on a high frequency welding installation with a generator G4000 SD and press KH500, both from the Kiefel Company, at room temperature. The following welding parameters were chosen:

| Welding pressure: | 1600 N |
|---|---|
| Welding time: | 4 s |
| Welding voltage: | 2100 V |
| Electrodes: | 150 × 5 mm |

The physical and mechanical characteristics of the foil and the welded joints are summarised in Table 1.

It is recognised that by the addition of PE1 the E-modulus lies at −30° C. at >20 MPa, and thus does not meet the requirements. Furthermore the material obtained is not sufficiently transparent. The characteristics with respect to HF weldability, light stability and ageing stability were however fully fulfilled by the material in the heat.

Example 2 (Reference Example)

The components given in the table were mixed. The manufacture of foil occurred analogue to Example 1. The cross-linking was omitted. A homogeneous foil was obtained with the characteristics given in the table.

The example shows a transparent, HF weldable foil which however because of the non-performance of cross-linking had not sufficient heat and light stability.

Example 3 (Invention)

The components given in the table were mixed together. The manufacture of foil occurred similarly to example 1. A homogeneous foil with the characteristics given in the table was obtained.

Example 3 shows a foil composition as against Examples 1 and 2 which has the material characteristics of transparency, high flexibility in the cold, no heat ageing, freedom from halogens and excellent HF weldability.

What is claimed:

1. A foil or molded body comprising a transparent and high frequency weldable polymer mixture of:
   a) at least one polymer selected from a copolymer of ethylene with about 8 to about 60% by weight of comonomers selected from vinyl esters of saturated $C_2$–$C_8$ carboxylic acids, $C_1$–$C_{12}$ alkylacrylates and methacrylates and having a melt index MFI (190° C.; 2.16 kg) of about 0.2 to about 15.0 g/10 min and
   b) a copolymer of ethylene with about 10 to about 30% by weight of $C_3$–$C_{12}$-α-olefin with a melt index MFI (190° C.; 2.16 kg) of about 0.2 to 15.0 g/10 min,
   wherein said polymer mixture has a gel content of between about 5 and about 45%, the weight ratio of components a) to b) is between about 95:5 and about 60:40, and the materials of the foil or molded body are partially crosslinked.

2. The foil or molded body according to claim 1, wherein the copolymer a) further comprises carbon monoxide as a termonomer.

3. The foil or molded body according to claim 1, further comprising an additional polymer with a glass transfer temperature of ≦−30° C.

4. The foil or molded body according to claim 3, wherein said additional polymer is a partially crosslinked thermoplastic elastomer.

5. The foil or molded body according to claim 3, wherein said additional polymer is a rubber-like poly(diene).

6. The foil or molded body according to claim 3, wherein said additional polymer is present in a quantity of up to about 20% by weight of the components a) plus b).

7. The foil or molded body according to claim 1, wherein components a) and b) comprise at least about 80% by weight of the foil or of the molded body.

8. The foil or molded body according to claim 1, further comprising anti-block agents, lubricants, light protective agents, antioxidants, dyes, pigments, flame retardant agents or anti-static agents, or mixtures thereof.

9. The foil or molded body according to claim 8, further comprising pigments in an amount of no more than 3% by weight.

10. The foil or molded body according to claim 1, wherein said partial crosslinking is produced by irradiation.

11. The foil or molded body according to claim 1, wherein said foil or molded body is layered, with the polymer mixture being supported on a carrier layer.

12. The foil or molded body according to claim 11, wherein the carrier layer is an intermediate interrupted layer supporting the polymer mixture on opposite sides thereof.

13. The foil or molded body according to claim 11, wherein the carrier layer is in the form of a web.

14. The foil or molded body according to claim 1, the surface of which is suitable for printing by corona processing, plasma processing or flaming.

15. The foil or molded body according to claim 1, wherein component a) is an ethylene-vinyl acetate copolymer.

16. The foil or molded body according to claim 1, wherein component a) includes about 14 to about 45% by weight of a polar comonomer.

17. The foil or molded body according to claim 1, wherein the melt index MFI of component a) is between about 0.3 and about 4.0 g/10 min.

18. The foil or molded body according to claim 1, wherein the melt index MFI of component b) is between about 0.2 and about 4.0 g/10 min.

19. The foil or molded body according to claim 1, wherein component b) further comprises a non-conjugated diene termonomer.

20. The foil or molded body according to claim 1, wherein said polymer mixture has a gel content of between about 10 and about 40%.

21. The foil or molded body according to claim 20, wherein said polymer mixture has a gel content of between about 10 and about 30%.

* * * * *